United States Patent [19]
Hlasnicek et al.

[11] 3,758,981
[45] Sept. 18, 1973

[54] MOBIUS BAND TYPE AMUSEMENT DEVICE

[76] Inventors: Richard S. Hlasnicek, Jamestown Star Rt., Boulder Heights, Colo.; Paula Towne, N. 6107 Monroe, Spokane, Wash.

[22] Filed: Aug. 29, 1972

[21] Appl. No.: 284,665

[52] U.S. Cl.............................. 46/43, 46/175, 46/47, 273/110
[51] Int. Cl............................................. A63h 33/00
[58] Field of Search ................... 46/47, 43, 175, 51, 46/52; 273/108, 109, 110

[56] References Cited
UNITED STATES PATENTS
2,466,116  4/1949  Marong.................................. 46/43
3,202,426  8/1965  Carper..................................... 46/43
3,502,335  3/1970  Scholin................................. 46/43 X Primary Examiner—Louis G. Mancene
Assistant Examiner—D. L. Weinhold
Attorney—Bertha L. MacGregor

[57] ABSTRACT

A Möbius band type amusement device comprising an initially flat rectangular elongated strip of flexible material having its ends joined after giving it a half twist (180°) or an odd number of half twists. A length of tubing, preferably transparent, is mounted on or integrally formed with both side surfaces of the Möbius strip, with its ends joined to form an endless tube which contains a ball or plurality of balls for travel in the tubing in a path which is continuous without going around an edge. Preferably the strip and tubing are made of flexible plastic material, not necessarily the same material, and the ball or balls are steel. Movement of the balls in the tubing may produce an audible sound which adds to the interest of the observer handling the device.

5 Claims, 4 Drawing Figures

PATENTED SEP 18 1973

3,758,981

MOBIUS BAND TYPE AMUSEMENT DEVICE

This invention relates to a Mobius band or strip type amusement device for entertainment and educational purposes.

A Mobius strip or band has been defined as a paradoxical figure constructed by joining the two ends of a flexible strip after giving it a half twist or an odd number of half twists. If the number of half twists is odd, the resultant ring will be a surface with only one side and one edge. A one sided surface is one which has only one side in the sense that any two moving objects on the surface can get to each other without going around an edge, regardless of where initially placed. A surface is one sided if it is non-orientable. It is non-orientable if and only if it contains a Mobius strip (James & James, Mathematics Dictionary).

The amusement device of this invention is designed to entertain and mystify observers and to encourage study of the structure and mathematics related thereto. The device comprises a Mobius band or strip which may be made of any suitable flexible material, such as plastics capable of being twisted, a length of tubing also made of flexible material, preferably transparent, integral with or mounted on opposite side surfaces of the Mobius strip, with ends connected to form an endless tube, and a plurality of small balls in the tube capable of traveling therein. An object of the invention is to generate audible sound as the balls move in the tubing; for example, the sound produced by steel balls moving in firm plastic tubing.

Figure 1:
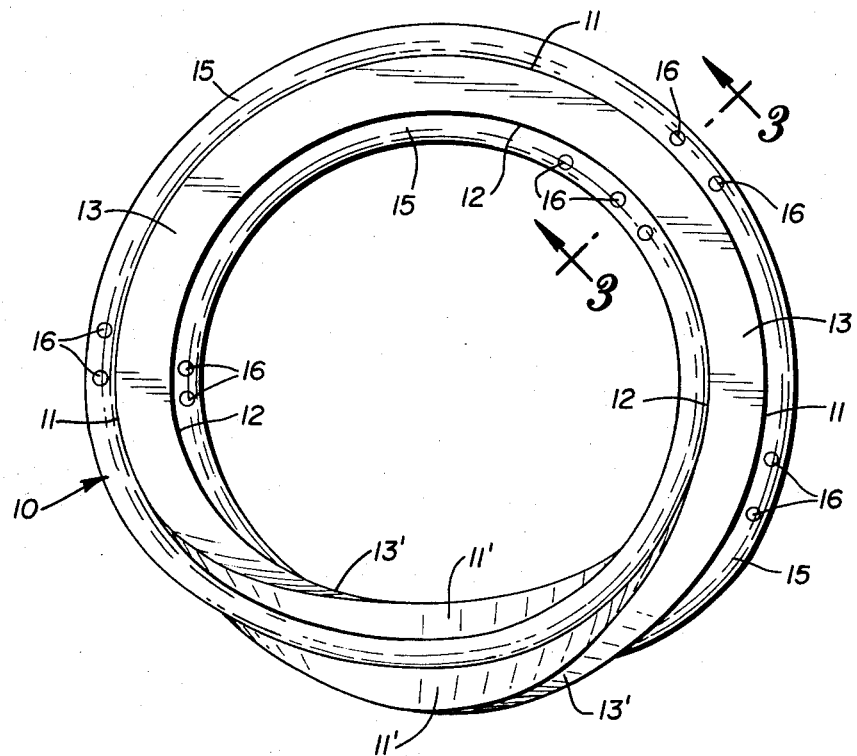
FIG. 1 is a top plan view of the Mobius band type amusement device embodying my invention.

The embodiment of the invention shown in the drawing comprises a rectangular strip of plastic material 10, initially flat, about 15 or 16 inches long, 1 ½ inches wide, and any desired thickness, usually ½ inch or less, depending on the flexible material selected for this purpose. The dimensions may vary both as to length and width, as well as thickness. The opposite side surfaces of the strip are designated 11 and 12, and referred to as the outer side 11 and inner side 12, but it will be understood that after the strip has been given a half twist, (180°), part of the outer side surface 11 designated 11' becomes an inner side, and part of the inner side 12 becomes an outer side. The top surface is designated 13 and the bottom surface is 14 in the major part of the top view of FIG. 1, but as the twisted area is approached, the top surface is designated 13' and occupies the position of the bottom surface 14 of the untwisted part of the strip.

Figure 2:
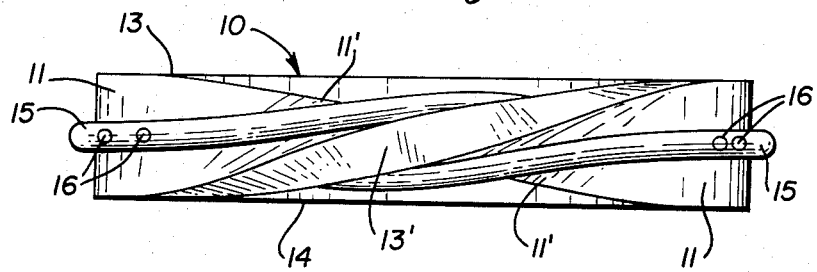
FIG. 2 is an elevational side view of the same, showing the side portrayed in the lower part of the top view of FIG. 1.
Figure 3:
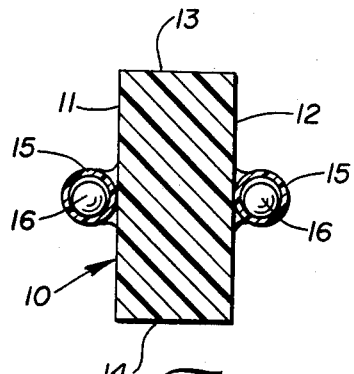
FIG. 3 is a transverse sectional view, on an enlarged scale, in the plane of the line 3—3 of FIG. 1.

A length of flexible, preferably transparent tubing 15 is mounted on both sides 11, 12, of the strip as shown in FIGS. 1-3. The tubing is flexible so that it can be twisted with the strip 10 on which it is mounted. The ends of the tubing are invisibly connected together. A ball or plurality of balls 16, preferably made of steel, travel freely in the endless tube 15 when the device is manually handled. The mounting means may be any suitable adhesive.

Figure 4:
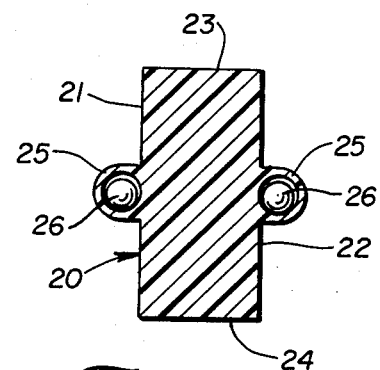
FIG. 4 is a view similar to FIG. 3 showing a modified construction of the strip and tubing.

As shown in FIG. 4, the device 20 has an outer side surface 21, inner side surface 22, top surface 23 and bottom surface 24, corresponding to the surfaces 10-14 respectively. The modification consists of the endless tube 25 which is integral with the strip 20. Balls 26 travel in the tube 25, as heretofore explained in connection with the tube 15 in FIGS. 1-3.

Although the tube 15 or 25 appears on two sides of the strip or band 10, it is continuous, and the balls 16 or 26 can move therein in a continuous endless path without going around an edge. Movement of the balls results when the device is handled by the observer, who becomes mystified thereby and interested to explain the endless continuous travel of the balls on what seems to be one side of the strip without going around an edge.

We claim:

1. A Mobius band type amusement device comprising
   a. a Mobius band made of an initially flat rectangular strip of flexible material having its ends joined after giving the strip a half twist or an odd number of half twists,
   b. a length of flexible tubing mounted on opposite side surfaces of the Mobius band and having its ends connected together to provide an endless bore in the tubing, and
   c. a ball movable in the tubing in a continuous endless path without passing around an edge of the strip.

2. The device defined by claim 1, in which the flexible tubing is transparent.

3. The device defined by claim 1, in which the flexible tubing and strip are integrally formed.

4. The device defined by claim 1, in which the tubing is made of firm plastic material and a plurality of balls are made of steel.

5. The device defined by claim 4, by which an audible sound is produced by movement of the balls in the tubing.

* * * * *